US008245832B2

(12) United States Patent
Fickeisen et al.

(10) Patent No.: US 8,245,832 B2
(45) Date of Patent: Aug. 21, 2012

(54) BELT CONVEYOR DEVICE

(75) Inventors: Steffen Fickeisen, Bad Dürkheim (DE); Joschka Neumann, Mannheim (DE)

(73) Assignee: Joseph Vogele AG, Ludwigshafen/Rhein (DE)

(*) Notice: Subject to any disclaimer, the term of this patent is extended or adjusted under 35 U.S.C. 154(b) by 120 days.

(21) Appl. No.: 12/849,410

(22) Filed: Aug. 3, 2010

(65) Prior Publication Data

US 2011/0024270 A1 Feb. 3, 2011

(30) Foreign Application Priority Data

Aug. 3, 2009 (EP) .................................... 09010011

(51) Int. Cl.
*B65G 17/28* (2006.01)
(52) U.S. Cl. ........................................ 198/313; 198/813
(58) Field of Classification Search .................. 198/300, 198/313, 860.1, 861.1, 813
See application file for complete search history.

(56) References Cited

U.S. PATENT DOCUMENTS

| 3,511,358 | A | * | 5/1970 | Peterson ........................ 198/813 |
| 4,846,338 | A | * | 7/1989 | Widmer ........................ 198/831 |
| 5,022,514 | A | * | 6/1991 | Lofberg ........................ 198/813 |
| 5,205,400 | A | * | 4/1993 | Breuss et al. ................. 198/812 |
| 7,497,326 | B2 | * | 3/2009 | McGuire et al. ........... 198/861.1 |
| 7,806,254 | B2 | * | 10/2010 | Brayman et al. .............. 198/832 |

FOREIGN PATENT DOCUMENTS

EP 0548661 6/1993
FR 2821833 9/2002
* cited by examiner

*Primary Examiner* — James R Bidwell
(74) *Attorney, Agent, or Firm* — Fish & Richardson P.C.

(57) ABSTRACT

A belt conveyor device for construction machines such as road finishing machines with a continuous conveyor belt that is carried in a conveying plane in a conveying duct by drive and tail pulleys situated inside the conveyor belt, and optionally by support rolls, which are installed in a frame structure defining the conveying duct. The drive and tail pulleys can be moved out of the conveyor belt for replacement with an adjustment arrangement that can be installed or integrated into the frame structure.

9 Claims, 7 Drawing Sheets

Figure 1:
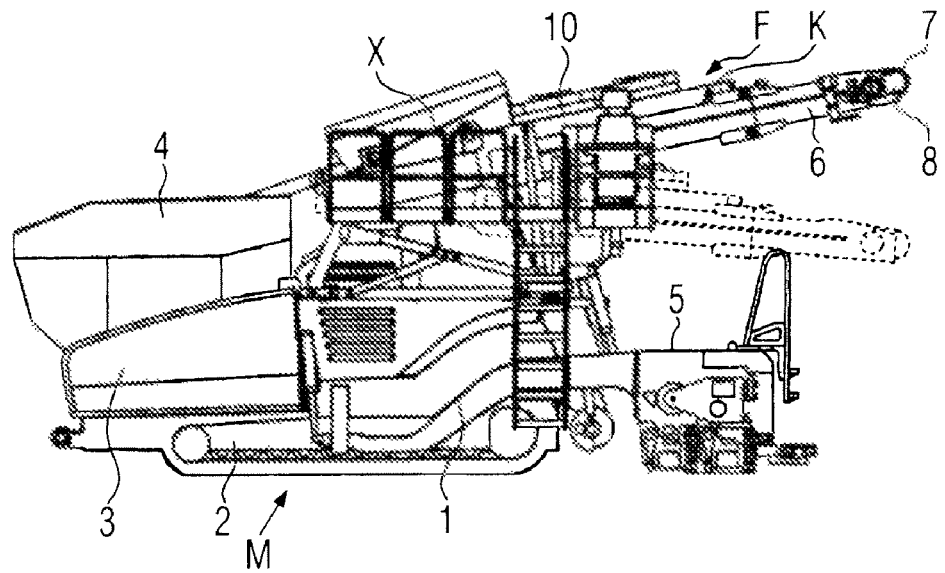

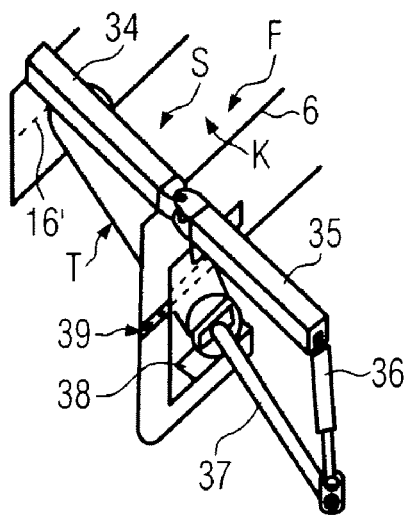
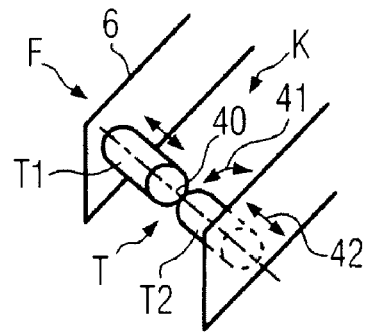
FIG. 9  FIG. 10
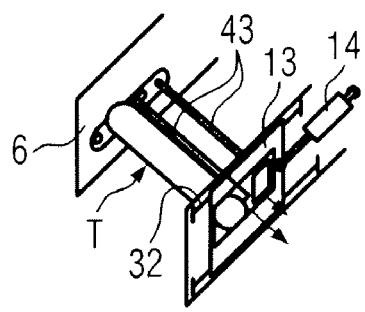
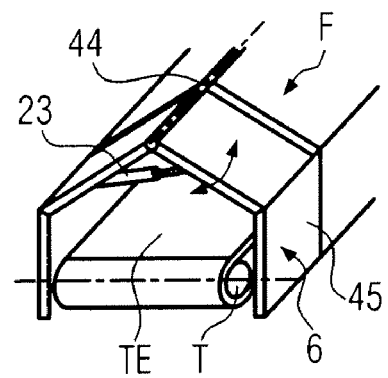
FIG. 11  FIG. 12
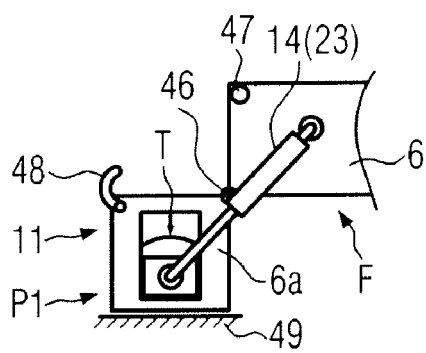
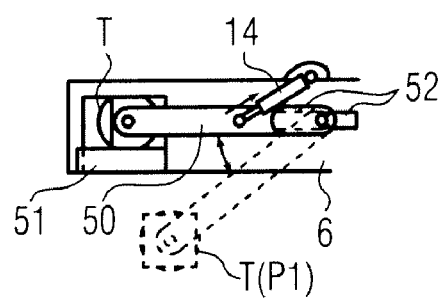
FIG. 13  FIG. 14

BELT CONVEYOR DEVICE

BACKGROUND OF THE INVENTION

The invention relates to a belt conveyor device of the type for construction machines such as road finishing machines, charging machines, millers, with a continuous conveyor belt that is carried in a conveying plane in a conveying duct by drive and tail pulleys situated inside the conveyor belt, and optionally by support rolls, which are installed in a frame structure defining the conveying duct enclosing the conveyor belt at least at both edge sides.

Construction machines in the form of a road finishing machine are and a charging machine known from the product range 2009 of the company JOSEPH VÖGELE AG, Neckarauerstr. 168-228, 68146 Mannheim Catalog/DE No.: 2129266 DE/02.09, pages 41 and 43, or in road millers known from practice, at least one belt conveyor device is provided each which is embodied as ascending conveyor and contains a continuous conveyor belt carried by internal drive and tail pulleys as well as support rolls. The drive and tail rolls and the support rolls are installed in the frame structure that is possibly covered on all sides. The conveyor belt can be a rubber belt with or without reinforcement, a steel belt or another conveyor belt which normally does not comprise any connecting link but is continuous. The belt conveyor can, for example, have a width of about 1.0 m and extend over a conveying length of about 5.0 m or more, and it is very heavy and relatively complicated to handle in case of a conveyor belt replacement. In case of damage or excessive wear, the conveyor belt must be replaced. In known belt conveyor devices, in most cases the defective conveyor belt is first separated at least one point and then removed from the frame structure to replace the conveyor belt. For this, parts of the frame structure must already be dismounted. To be able to install a spare conveyor belt, all components arranged inside the conveyor belt, i.e. the drive pulley, the tail pulley, the support rolls, and the like, must be first manually removed before the spare conveyor belt can be installed. Then, all these components must be reinstalled. For this, it is common to completely remove the complete drive pulley drive stations, the tail pulley stations, and the support roll stations and the like. Therefore, belt conveyor replacement involves a considerable downtime of the belt conveyor device and a high amount of assembly work.

FR 28 21 833 A relates to a belt conveyor device for conditioning comestible goods. The entire frame structure containing the pulleys and longitudinal stiffening tubes and side rail, in which frame structure the conveyor belt is running, is pivoted manually in joints provided at the longitudinal side of the frame structure in order to facilitate easy cleaning and a conveyor belt replacement. The joints commonly define an axis parallel to the conveying plane and perpendicular to the axes of the pulleys about which axes the frame structure is pivoted upwardly. In order to relieve the conveyor belt, furthermore, an end section of the frame structure can be folded upwardly above an axis parallel to the pulley axes and parallel to the conveying plane. A trail pulley is suspended in the foldable end section. A displacement into the replacement position is executed manually. For belt conveyor devices of construction machines where each pulley may have a weight of about 200 kg and the conveyor belt itself may have a weight minimum 150 kg, the know principle cannot be used.

EP 0 548 661 A discloses a belt conveyor device for conveying various matters e.g. candy goods. The frame structure of the belt conveyor device, containing a trail pulley, a drive pulley and further deflecting rods or trail pulleys is pivoted upwardly relative to a stationarily mounted tensioning pulley about a sidewardly located axis parallel to the conveying plane and perpendicular to the pulley axes. The adjustment into the replacement position is carried out manually by gripping handles of the frame structure. The upwardly pivoted frame structure temporarily may be locked in place. For belt replacement the conveyor belt additionally can be relieved by first pivoting a trail pulley by an eccenter mechanism and by pivoting the conveyor belt with the frame structure relative to the stationarily mounted tensioning pulley.

OBJECTS OF THE INVENTION

The object underlying the invention is to provide a belt conveyor device for construction machines such as road finishing machines, charging machines, millers, with a continuous conveyor belt that is carried in a conveying plane in a conveying duct by drive and tail pulleys situated inside the conveyor belt, and optionally by support rolls, which are installed in a frame structure defining the conveying duct enclosing the conveyor belt at least at both edge sides, wherein at least the drive and tail pulleys are installed in the frame structure to be moved out of the conveyor belt into a replacement position by means of an adjusting means integrated in or installable into the frame structure in which replacement position the respective pulley or at least one pulley end is placed outside the conveying duct for a conveyor belt replacement, and that the respective drive or tail pulley is either installed in the front frame structure detachably at one pulley end, and can be swivelled at the other pulley end in the frame structure to the replacement position about an adjusting axle which is substantially perpendicular to the conveying plane and essentially transverse to the pulley axle, the adjusting axle being located in the frame structure, in which replacement position the pulley is positioned outside of the conveying channel in an alternative space situated outside the conveying channel and being open towards the conveying channel or is detachable from the frame structure and laterally shifted out of the frame structure into the replacement position out of the conveying belt in the direction of the pulley axle at a guide means contained in the frame structure. in which the downtime and the assembly work for replacing a conveyor belt can be clearly reduced.

This object is achieved with the belt conveyor arrangement of the present invention.

As at least the drive pulley and the tail pulley can be moved to a replacement position by means of the adjusting means at the frame structure, where the respective pulley or at least one pulley end is placed outside the conveying duct to replace the conveyor belt, and the adjusting means perform the adjusting movements of the pulleys, the complete stations must be neither manually removed and reinstalled, nor is any excessive assembly work required for this. In this manner, conveyor belt replacement can be at least partially automated. As the adjusting means adjust the replacement position at least of the respective pulley, advantageously also of the support rolls, the spare conveyor belt can be installed more quickly than before, and the downtime of the belt conveyor device for conveyor belt replacement is drastically reduced. The additional structural efforts for the adjusting means are negligible in the belt conveyor device, as simple components are sufficient for this task, and as components anyway required for the operation can be optionally shared, and at least the drive pulley and the tail pulley must be only installed in the frame structure such that they can be, with only minor assembly efforts, possibly without any special tools, easily detached and quickly moved, by means of the adjusting means, from the operating position to the replacement position in which the spare conveyor belt can be easily mounted. The respective pulley is either at one pulley end detachably installed in the frame structure, and can be pivoted into the replacement position at the other pulley end in the frame structure about an adjusting axle essentially located transverse to the pulley axle, preferably guided on or in guides of the frame structure, in which position the pulley is positioned outside the conveying duct either completely or at least with the one pulley end. This adjustment operation can be carried out relatively quickly involving only minor assembly works. To provide sufficient space in the conveying duct for inserting the spare conveyor belt, an alternative space for the pulley respectively moved to the replacement position is advantageously provided in the frame structure, which space is situated outside the conveying duct and open towards the conveying duct. By this, the heavy spare conveyor belt which is complicated to handle can be easily introduced into the conveying duct without being hindered by the pulley moved to the replacement position or the support rolls moved to the replacement position. The support rolls are moreover advantageously brought to replacement positions outside the conveying duct, similar to the pulleys. So-called carrying garlands can be particularly easily brought out of the conveying duct by either being hung out at one end and shifted outwards out of the frame structure, or by being completely hung out. For adjusting the support rolls, too, adjusting means and adjusting drives can be used to reduce assembly works for this. Then, either the spare conveyor belt can be mounted from outside over the one pulley end, and introduced into the conveying duct when the pulley is swivelled back into the operational position, or the conveying duct is opened by the swivelled pulley, so that the spare conveyor belt can be inserted into the conveying duct before the pulley is swivelled back into the operating position and the conveyor belt. Moreover, the defective conveyor belt can be removed more easily using the clearance created by the movement of the respective pulley, and optionally the support rolls, to the replacement position, possibly without having to be cut and unthreaded with an effort. Alternatively, it can be advantageous to separate the defective conveyor belt, as it was common until now, and to optionally even separate it into individual sections and remove it from the frame structure, while here the pulleys and possibly support rolls yet do not necessarily have to be moved to the replacement positions. Alternatively, the respective pulley is first detached from the frame structure and then laterally shifted out of the frame structure into the replacement position in the direction of the pulley axle at guide means contained in the frame structure. The weight load of the pulley is introduced into the frame structure via the guide means after the pulley has been detached from the frame structure. The spare conveyor belt can be shifted onto the pulley located in the replacement position outside the conveying duct and then brought back into the conveying duct together with the pulley, or it is positioned in the conveying duct before the pulley is shifted back into the operating position The respective pulley may remain connected to the frame structure at least one pulley end in the replacement position. It is true that the considerable weight of the pulley must be moved when it is moved to the replacement position and back, but only in the conveying plane. For this, the adjusting means or suited adjusting drives are used. However, the weight load of the pulley is still carried, as before, by the frame structure during the movement into the replacement position, so that for this no separate hoisting devices or other auxiliary tools, such as winches or lifting blocks, are required.

To still further reduce the time for conveyor belt replacement, in one advantageous embodiment, at least one pulley is directly replaced by a replacement components pack that can be inserted into the frame structure in the replacement position, in which the spare conveyor belt is held ready reeled on a reserve drive pulley and/or a reserve tail pulley, preferably including reserve support rolls contained in the drum. The previously used pulley is removed in the replacement position. As the spare conveyor belt in the replacement components pack is already correctly placed on the pulleys and around the support rolls, the lateral mounting of the conveyor belt onto the pulley placed in the replacement position, which can be time-consuming and cumbersome with the high weight of such a spare conveyor belt, is dispensed with. The removed pulley can be reused for preparing another replacement components pack for the next conveyor belt replacement.

It is convenient for the adjusting means to comprise preferably mechanically or hydraulically actuated adjusting drives which can be brought into an adjusting application at least at one pulley or an adjustable section of the frame structure containing at least one pulley. With these adjusting drives, the high weight that cannot be avoided with such large belt conveyor devices at least for the pulleys or the sections can be easily received and these assemblies can be moved precisely and quickly.

Advantageously, at least some of the adjusting drives of the adjusting means of the belt conveyor device which are employed for conveyor belt replacement are hydraulic conveyor belt tensioning cylinders of the belt conveyor device. These tensioning cylinders, which are required anyway in the operation of the belt conveyor device, then fulfil a double function as they are also employed for conveyor belt replacement.

To be able to perform a conveyor belt replacement even on site, it can be advantageous to hold the replacement components pack or only the spare conveyor belt ready in a magazine at the belt conveyor device or the construction machine, i.e. to carry it along at least if an early defect of the belt conveyor begins to show due to the accomplished operating hours or for other reasons.

The time for a conveyor belt replacement can be particularly efficiently reduced if the adjusting means are integrated in the belt conveyor device and can be operated semi-automatically or all-automatically. The adjusting means assist in the conveyor belt replacement such that it is no longer necessary to manually remove and install the respective stations completely. At the most, it can be necessary to dismount or at least open some coverings or parts of the frame structure for a conveyor belt replacement.

The hydraulic adjusting drives of the adjusting means are advantageously fed from a hydraulic system of the belt conveyor device and/or the construction machine and are, for example, hydraulic cylinders. As an alternative, it would be possible to equip the adjusting means with a separate hydraulic system or at least a hydraulic hand pump.

The respective pulley (tail pulley or drive pulley) may be approximately centrically divided into two pulley parts. In case of a drive pulley, drive motors can be provided for both pulley parts, so that no connecting axle between the pulley parts is required. However, as an alternative, it is possible to interconnect the two pulley parts via a removable connecting axle, as long as the pulley is in its operating position, and to optionally only provide one drive motor. A provided connecting axle is removed for replacing the conveyor belt. For conveyor belt replacement, each pulley part in the frame structure is moved to the replacement position either about a swivel pin approximately transverse to the pulley axle, or shifted approximately in the direction of the pulley axle outwards out of the conveying duct into the replacement position to be able to easily introduce the spare conveyor belt into the conveying duct.

As an alternative, it is furthermore possible to define the replacement position of the pulley by at least one wall region or section of the frame structure being folded away e.g. by means of the adjusting means, or being even completely removed to expose at least one pulley end for mounting the spare conveyor belt.

BRIEF DESCRIPTION OF THE INVENTION

Figure 2:
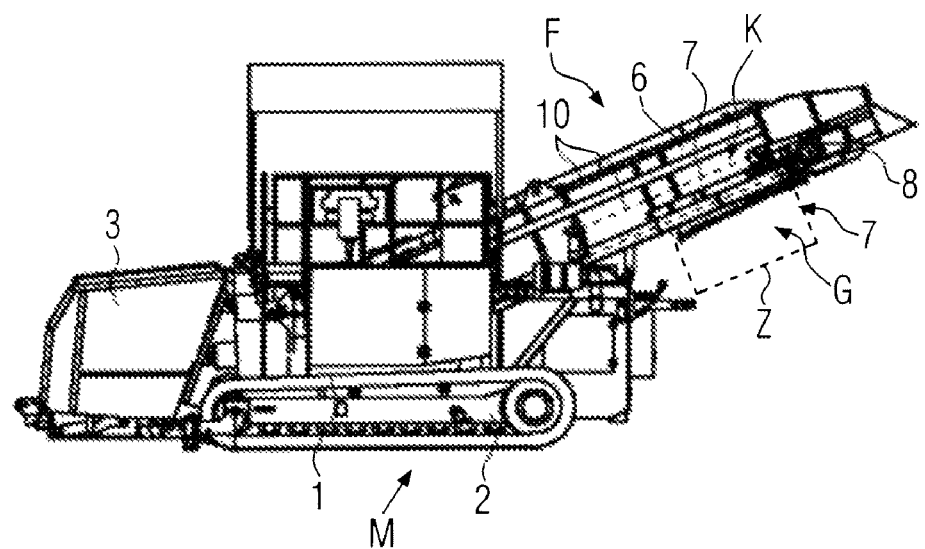
Figure 3:
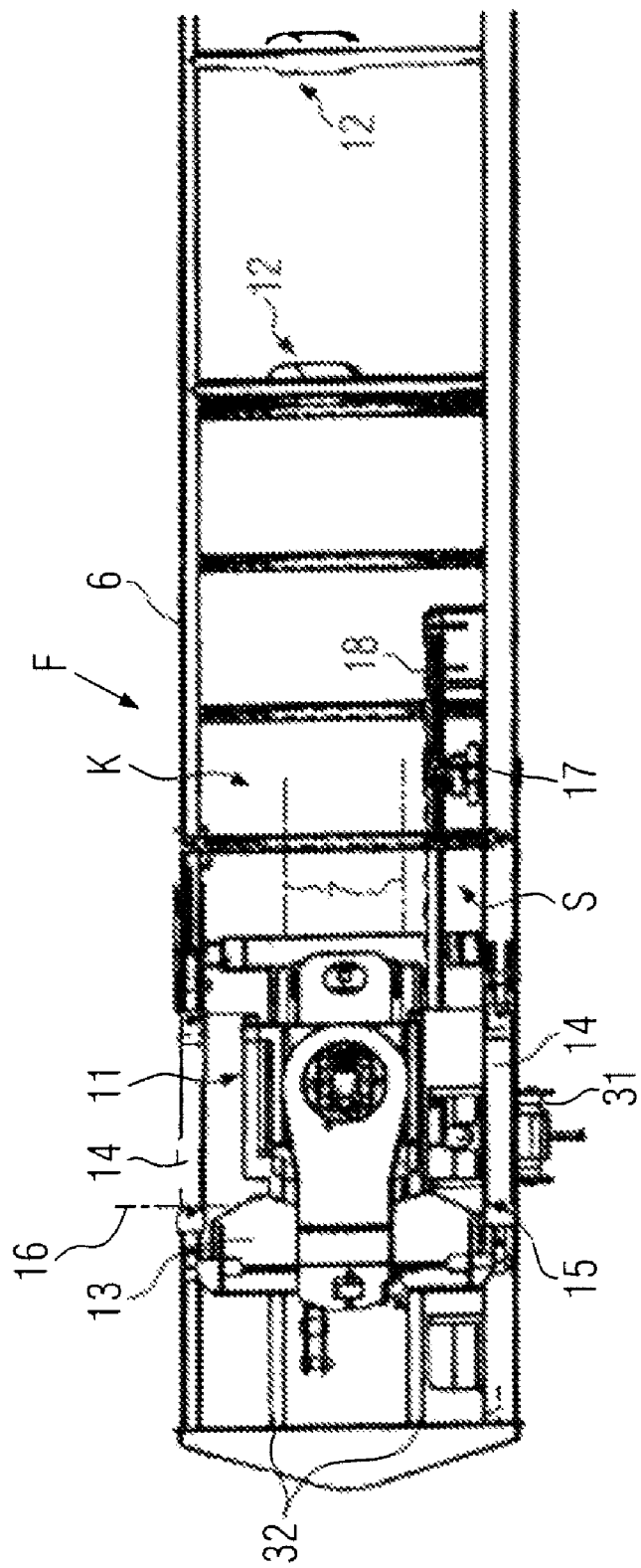
Figure 4:
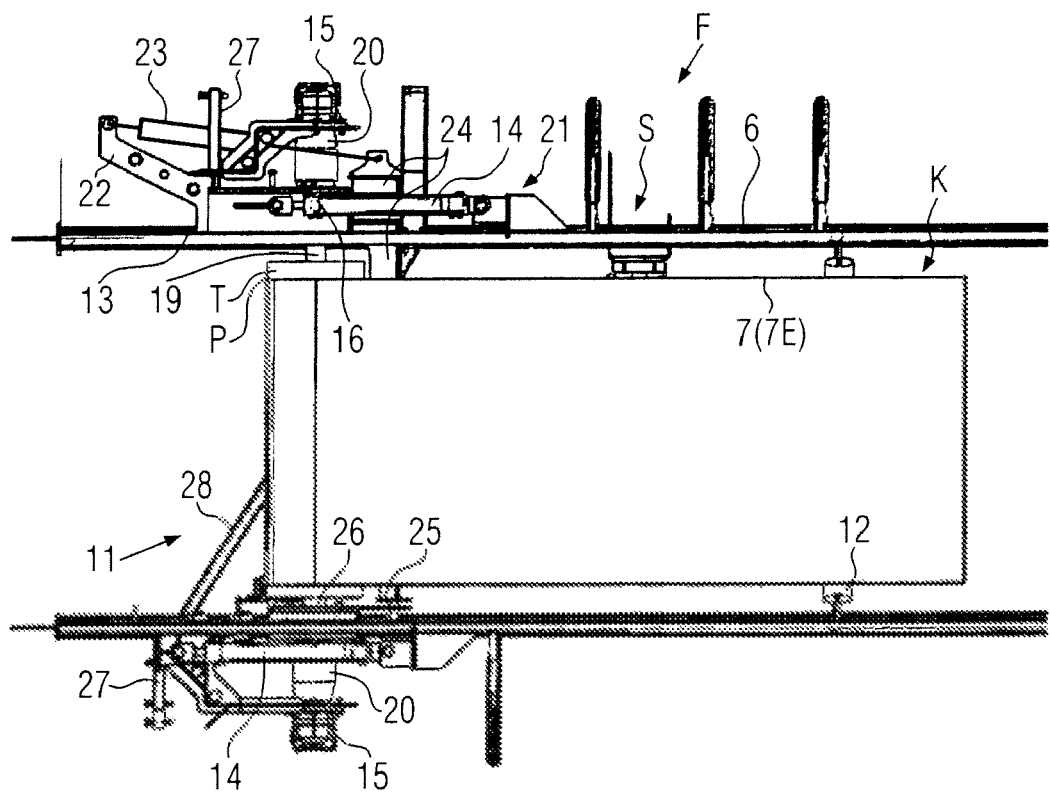
Figure 5:
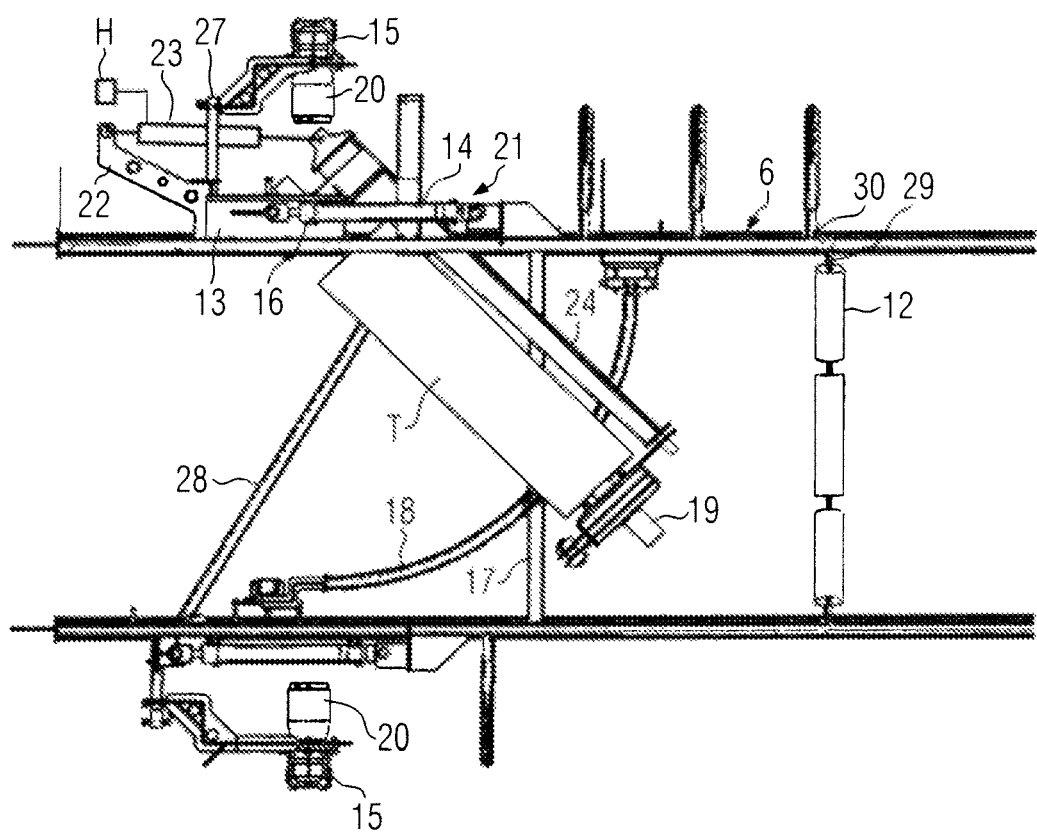
Figure 6:
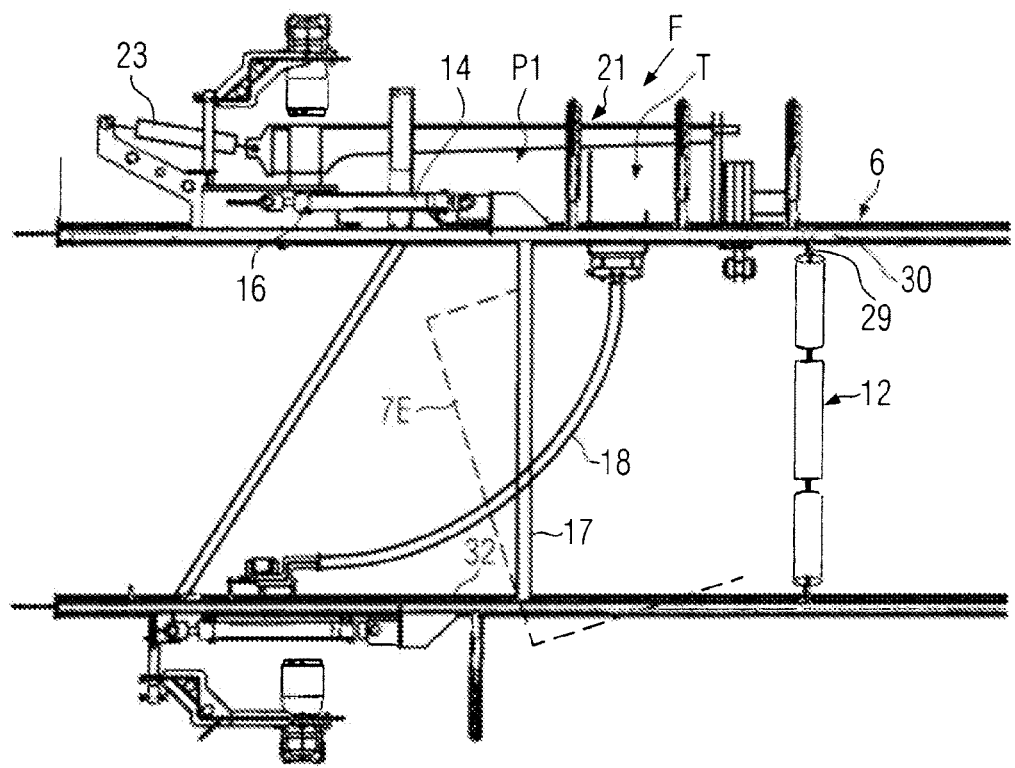
Figure 7:
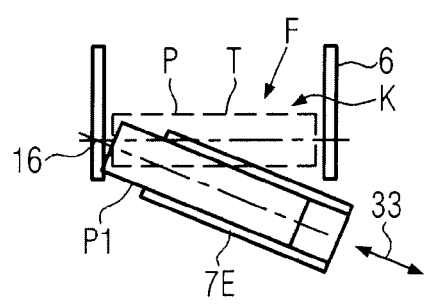
Figure 8:
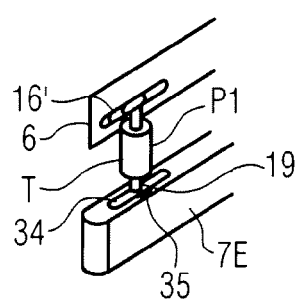
Figure 15:
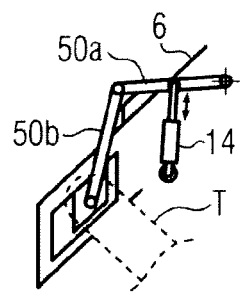
Figure 16:
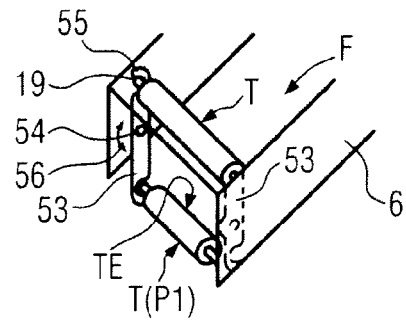
Figure 17:
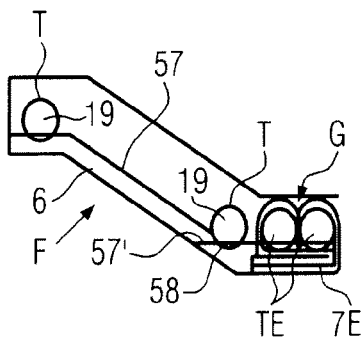
Figure 18:
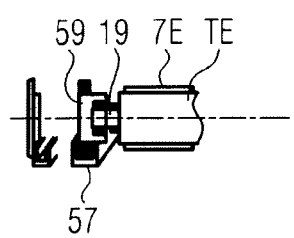
Figure 19:
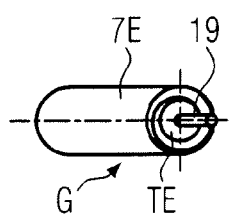
Figure 20:
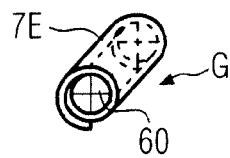
Figure 21:
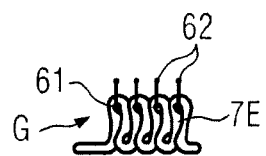
Figure 22:
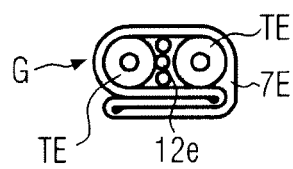

With reference to the drawings, embodiments of the subject matter of the invention will be illustrated. In the drawings:

FIG. 1 shows a schematic side view of a construction machine embodied as road finishing machine with a belt conveyor device, FIG. 2 shows a schematic side view of a construction machine embodied as charging machine and equipped with a belt conveyor device, FIG. 3 shows a side view of an end section of a belt conveyor device with non-depicted or removed coverings, in the region of a drive pulley station, and in the operating position, FIG. 4 shows a plan view of FIG. 3, FIG. 5 shows a plan view similar to that of FIG. 4, however in an intermediate phase of a conveyor belt replacement, FIG. 6 shows a plan view corresponding to that of FIG. 4 during the conveyor belt replacement, FIG. 7 shows a schematic front view of another embodiment of a belt conveyor device, FIG. 8 shows a schematic perspective representation of a detail of a belt conveyor device in a further embodiment, FIG. 9 shows a schematic perspective representation of another embodiment of a belt conveyor device, FIG. 10 shows a schematic perspective representation of another embodiment of a belt conveyor device, FIG. 11 shows a schematic perspective representation of another embodiment of a belt conveyor device, FIG. 12 shows a schematic perspective representation of another embodiment of a belt conveyor device, FIG. 13 shows a schematic side view of a part of another embodiment of a belt conveyor device, FIG. 14 shows a schematic side view of a part of another embodiment of a belt conveyor device, FIG. 15 shows a schematic perspective representation of a part of another embodiment of a belt conveyor device, FIG. 16 shows a schematic perspective representation of a part of another embodiment of a belt conveyor device, FIG. 17 shows a schematic side view of another embodiment of a belt conveyor device, FIG. 18 shows a perspectively indicated detail of the belt conveyor device of FIG. 17, FIG. 19 shows in a schematic perspective representation a replacement components pack prepared for performing a conveyor belt replacement in at least one of the above shown embodiments of belt conveyor devices, FIG. 20 shows in a schematic perspective representation another embodiment of a prepared drum, FIG. 21 shows a schematic side view of a replacement components pack of another embodiment prepared for a conveyor belt replacement, and FIG. 22 shows a side view of another embodiment of a replacement components pack provided for a conveyor belt replacement.

DETAILED DESCRIPTION OF THE INVENTION

With reference to FIGS. 3 to 6, an embodiment of a belt conveyor device F either with permanently integrated or optionally installable adjusting means S for performing a conveyor belt replacement will be illustrated. The belt conveyor device F is an integral machine component for example in construction machines M, such as road finishing machines, charging machines or millers (FIGS. 1 and 2) to convey laying material (bituminous, hot laying material or concrete laying material, or removed material). The belt conveyor device F for example has a width of about 1.0 m and a conveying length of at least about 5.0 m, and it contains a continuous conveyor belt 7 (normally without connecting link) which can be a reinforced or non-reinforced rubber belt or a steel conveyor belt, or the like.

The construction machine M shown in FIG. 1 is a road finishing machine having a chassis 1 which drives on a running gear 2 on a subgrade and forms a surfacing of laying material. A bunker 3 is arranged in the chassis 1, here with an inserted bunker insert 4, among other things also for the laying material, which is laid with a screed 5. The belt conveyor device F (ascending conveyor device) integrated in the construction machine M above the chassis 1 leads from the bunker insert 4 over and beyond the screed 5 to transfer laying material from a second bunker X backwards, for example to another road finishing machine. The belt conveyor device F comprises a frame structure 6 in which a conveying duct K is defined, the continuous conveyor belt 7 conveying, with its upper conveyor strand, the laying material through the conveying duct K into the region of a discharge end or a tail station 8. The frame structure 6 can have coverings 10 on all sides. Optionally, the conveying duct K is even heated (not shown).

The construction machine M shown in FIG. 2 is a charging machine which charges a following, non-depicted road finishing machine with laying material. At the chassis 1 which drives on the running gear 2, a material bunker 3 is disposed from which the belt conveyor device F extends backwards in an ascending manner. The belt conveyor device F contains the continuous conveyor belt 7 indicated in a dashed line, which extends in the conveying duct K that is covered, for example, by coverings 10 in the frame structure 6. The conveyor belt 7 is deflected in a tail station 8. An also provided drive pulley station, for example at the lower end of the belt conveyor device F, is not shown. At the bottom side of the belt conveyor device F or (not shown) at the construction machine M, a magazine Z can be provided in which either a replacement components pack G or only a spare conveyor belt 7E can be held ready for a conveyor belt replacement. The replacement components pack G can comprise at least one pulley and the spare conveyor belt 7E as will be illustrated later.

Adjusting means S provided in the belt conveyor device F in FIGS. 3 to 6 which are used for a conveyor belt replacement, where the belt conveyor device can be, for example, the belt conveyor device shown in FIGS. 1 and 2, however without coverings 10 for better illustration, are either permanently incorporated in the belt conveyor device or the frame structure 6, respectively, or are at least partially installed at assembly positions prepared for this only for a conveyor belt replacement.

In FIGS. 3 to 6, the frame structure 6 is constructed of longitudinal and vertical members, and preferably also diagonal cross members 28, and stiffened by means of cross parts provided at the front and rear ends. Here, a drive pulley station 11 is contained in the frame structure 6. A tail station is located at the other end of the frame structure 6 (not shown). Between them, support rolls 12 can be installed, optionally at distances between them, for example so-called carrying garlands (cf. FIG. 5). In the operating position shown in FIG. 3, the conveyor belt 7 is supported on pulleys T in the drive pulley station 11 (and the non-depicted tail pulley station) and is supported on the support rolls 12 at least with the upper conveyor strand (troughed belt conveyor).

At each side of the drive pulley station 11, a slide 13 is mounted at the outer side in the frame structure 6 which can be adjusted by a conveyor belt tensioning cylinder 14 (hydraulic cylinder) in the longitudinal direction and is, for example, guided and positioned in lower guide rails 32 of the frame structure 6. At least on one side of the frame structure 6, preferably at both sides of the frame structure, drive motors 15 are mounted at cross brackets 27 (FIGS. 3 and 4) of the slides 13 adjustable in the transverse direction, which are coupled, for example via ETP bushings 20, with a drive shaft 19 of the pulley T. The pulley T is mounted with its drive shaft 19 in a frame 24 which can be swivelled in the slide 13 at the upper side in FIG. 4 about an adjusting axle 16 which is here vertical or essentially transverse with respect to the pulley axle and connected at the other end to a bedding in the slide 13 there via a coupling 25. For conveyor belt replacement, an arched guide rail 18 and a guide rail 17 extending crosswise can be furthermore inserted in the frame structure 6. The guide rails 17, 18 can be removed. In this region of the frame structure 6, the vertical members of the grid frame are curved outwards, so that a clearance 21 open towards the inner conveying duct K, but located outside the conveying duct K is formed at least at the side of the adjusting axle 16 into which the pulley T can be swivelled to a replacement position P1 (FIG. 6), so that it is completely shifted out of the region of the conveying duct K. Under both slides 13 or under the arched guide rail 18, lifting brackets 31 are arranged laterally in the frame structure 6, which contain e.g. spindle motors, screwjacks or hydraulic cylinders as adjusting drives to be able to lift at least the frame 24 and/or the slide 13 out of the guide rails 32, so that the frame 24 can be swivelled about the adjusting axle 16.

An adjusting drive 23 is or will be attached to a bracket 22 attached to the frame structure 6, e.g. a hydraulic cylinder of which the other end is hinged at the frame 24. The frame 24, the adjusting drive 23, the guide rails 17, 18, the lifting brackets 31 form part of the adjusting means S which are used for a conveyor belt replacement which can be optionally even carried out semi-automatically or all-automatically.

In FIGS. 3 and 4, the belt conveyor device F is shown in the operating position, either before a conveyor belt replacement or after a conveyor belt replacement, with an inserted conveyor belt 7 or spare conveyor belt 7E. The slides 13 and the frame 24 are for example positioned over the guide rails 32 and can be shifted in the frame structure 6 by means of the tensioning cylinders 14. The drive motors 15 are coupled to the drive shaft 19 of the pulley T. The lifting brackets 31 are lowered. The adjusting drive 23 is not actuated or depressurized. The support rolls 12 support the conveyor strand of the conveyor belt 7.

FIGS. 5 and 6 show two phases in a conveyor belt replacement or in preparation to a conveyor belt replacement. Moreover, it is indicated in FIGS. 5 and 6 that the support rolls 12, here carrying garlands, with support structures 29 and detachable pins 30 are installed in the frame structure 6 detachably, or at least detachably at one end. By removing the lock pin 30, the support rolls 12 can be shifted out of the conveying duct for a conveyor belt replacement.

In case of a defect or excessive wear of the conveyor belt 7, the conveyor belt must be replaced. The defective conveyor belt 7 is either separated or cut at several points and removed from the conveying duct, or the pulleys T and the support rolls 12 are shifted to replacement positions out of the conveying duct for this to be able to remove the defective conveyor belt without cutting it.

In preparation at least to the insertion of the spare conveyor belt 7E, first (FIG. 5) the guide rail 17 is inserted into the frame structure 6, and on top of it, the guide rail 18 is inserted. Then, the drive connection of the drive motors 15 with the drive shaft 19 of the pulley T is interrupted e.g. via so-called ETP bushings 20, and the drive motors 15 are moved outwards with the ETP bushings 20 on the brackets 27 according to FIG. 5. For this, non-depicted adjusting drives of the adjusting means S can be even used. Then, guide rails or directly the slides 13 are lifted by means of the lifting brackets 31 until the frame 24 is decoupled to be swivelled about the adjusting axle 16. The adjusting drive 23 is actuated to swivel the frame 24 with the pulley T about the adjusting axle 16, the pulley T being guided at least on the guide rail 18. The adjusting drive 23 is, for example, a hydraulic cylinder which is connected to a hydraulic system H either of the belt conveyor device (the drive motors 15 are advantageously also hydraulic motors) or the construction machine M and actuated by means of non-depicted control valves.

The pulley T is swivelled into the clearance 21 via the intermediate position shown in FIG. 5 to a final replacement position P1 (FIG. 6) in which the pulley T has completely exited from the conveying duct K. Then, the support rolls 12 can be detached and also shifted out of the conveying duct K or completely dismounted. To move the pins 30, adjusting drives can also be optionally employed. Subsequently (FIG. 6), the guide rails 17 and 18 are taken out of the frame structure 6, and the spare conveyor belt 7E is introduced into the conveying duct K, for example from the bottom, e.g. with a hoisting device or lifting blocks (FIG. 6, indicated in dashed lines), such that the bend of the spare conveyor belt 7E is open. Then, by means of the adjusting drive 23, the pulley T is swivelled via the intermediate position shown in FIG. 5 into the spare conveyor belt 7E and finally into the operating position shown in FIG. 4. In the process, the spare conveyor belt 7E can be easily properly positioned on the pulley T. While the pulley T is swivelled back, the guide rails 17, 18 can be temporarily reinserted into the frame structure 6 inside the loop of the spare conveyor belt 7E. Then, the frame 24 is again coupled to both slides 13, and, after the guide rails 17, 18 have been removed, the slides 13 are lowered by means of the lifting brackets 31 until they are again properly locked with the guide rails 32. Subsequently, the drive motors 15 on the brackets 27 are again moved inwards and coupled with the drive shaft 19 of the pulley. Then, or already beforehand, the support rolls 12 can be anchored in the frame structure 6 between the two strands of the spare conveyor belt 7E.

In the tail pulley station not shown in FIGS. 3 to 6, the same procedure is correspondingly followed with adjusting drives provided or installed there, where optionally no drive motors are provided in the tail pulley station, so that manipulation is easier. Finally, the spare conveyor belt 7E is correspondingly tensioned by means of the tensioning cylinders 14, the coverings are again attached to the frame structure 6, if necessary, and the belt conveyor device F can be put into operation again.

In the alternative embodiment of the belt conveyor device F in FIG. 7, the frame structure 6 optionally comprises stable side walls in which the pulley T is rotatably mounted in the operating position P represented in a dashed line. One pulley end is mounted in one side wall so that it can be swivelled about the here essentially horizontal adjusting axle 16' extending approximately perpendicular to the pulley axle, while the other pulley end is detachably connected to the other side wall. For conveyor belt replacement, the detachable pulley end is detached, and the pulley T is lowered by means of an adjusting drive, corresponding to the adjusting drive 23 of FIG. 6, only by some angular degrees around the adjusting axle 16' until the detachable pulley end has come out of the conveying duct K. In this replacement position P1, the spare conveyor belt 7E is mounted on the pulley T in the direction of the double arrow 33. Then, the pulley T is swivelled upwards around the adjusting axle 16' and again properly fixed. The spare conveyor belt 7E can then be drawn into the frame structure manually or by a non-depicted Bowden control, or by means of the drive pulley.

In the embodiment in FIG. 8, the pulley T can be swivelled from the operating position by approximately 90° about the adjusting axle 16' in the frame structure 6 downwards into the replacement position P1, after one pulley end has been detached from the frame structure. This swivelling motion can be performed by means of an adjusting drive similar to the adjusting drive 23 in FIG. 6. At the lower end of the drive shaft 19 of the pulley T, a plate 34 can be arranged such that it can be rotated, the plate 34 being oriented in the position which is shown in FIG. 8 when the spare conveyor belt 7E is being mounted on the pulley T. As soon as the spare conveyor belt 7E has been brought far enough upwards over the pulley T, the plate 34 is rotated by about 90° in the direction of the double arrow 35 on the drive shaft 19 of the pulley T, so that both edges of the mounted spare conveyor belt 7E stand on the plate 34. Then, the pulley T with the mounted spare conveyor belt is again swivelled upwards and fixed.

In the embodiment in FIG. 9, a crossbeam 34 is attached above the conveying duct permanently or only for conveyor belt replacement at the frame structure 6 of the belt conveyor device F as a part of the adjusting means S, a crane girder 35 being arranged at the crossbeam in a swivelling manner. A hydraulic cylinder 36 is hinged to the outer end of the crane girder 35. For conveyor belt replacement, a hollow tube is placed on the pulley T from one pulley end, or a rod 37 is inserted. The free end of the rod 37 is connected to the hydraulic cylinder 36. After the hydraulic cylinder 36 has been actuated, the lower part of a guide or bedding of this pulley end can be removed to provide a clearance. By means of the hydraulic cylinder 36, the pulley is swivelled downwards about the adjusting axle 16' which is here, for example, essentially horizontal until the pulley end or the rod 37 rests on a support 38 which can be for example foldable about a joint 39 in the frame structure 6. The hydraulic cylinder 36 is then detached. The crane girder 35 is swivelled to the side. Now, the spare conveyor belt 7E can be shifted onto the rod or the hollow tube 37, after which the crane girder 35 is again swivelled outwards and the hydraulic cylinder 36 is again connected to the free end of the rod 37. Subsequently, the pulley T is swivelled at least somewhat upwards by the hydraulic cylinder 36, so that the spare conveyor belt 7E can be easily pushed onto the pulley T completely. To this end, the support 38 is arranged such that an open mouth for introducing the spare conveyor belt 7E is created on one side. Subsequently, the pulley T is completely lifted by means of the hydraulic cylinder 36, so that the lower guide means of the pulley end can be reinstalled. Then, the tube 37 is removed and the crane girder 35 is swivelled back.

In the embodiment in FIG. 10, the respective pulley T is divided into two pulley parts T1, T2 approximately centrically which each project from the frame structure 6 towards the center into the conveying duct K. If it is the drive pulley station, both pulley parts T1, T2 can comprise separate, outside drive motors, and/or both of them are coupled to each other by pulley parts T1, T2 driven by only one outside drive motor by a removable connecting axle 40. The two pulley parts T1, T2 can be moved into the replacement positions in the frame structure 6 (after the optionally provided connecting axle 40 has been removed) either in the direction of the double arrows 41 or in the direction of the double arrows 42, i.e. they can be either swivelled or shifted in the direction of the pulley axle to be able to open the conveying duct K to introduce the spare conveyor belt 7E.

In the embodiment in FIG. 11, the pulley T can be shifted to the side out of the frame structure 6 on guides 43 (e.g. one round guide and one flat guide) arranged in the frame structure 6, e.g. by means of a non-depicted adjusting drive, and possibly relative to the slide 13 at which the tensioning cylinder 14 acts and at which the drive motor and the like (not shown) are arranged. Then, the spare conveyor belt 7E can be introduced before the pulley T is again pushed back into the operating position shown in FIG. 11 on the guides 43.

In the embodiment in FIG. 12, the pulley T is detachably connected to the frame structure 6 on the right side. For conveyor belt replacement, a front part of the frame structure 6 or a covering or side wall 45 is folded upwards about an adjusting axle 44 by means of at least one adjusting drive 23 in the direction of the double arrow. The pulley T remains cantilevered in this position as it is supported in the remaining part of the frame structure 6. Via the thus exposed one pulley end, the spare conveyor belt 7E is introduced into the conveying duct K. Then, the frame structure 6 or the covering 45 is again swivelled back about the adjusting axle 44 and the pulley end is again properly fixed. As an alternative, both sides of the frame structure can be optionally folded upwards.

In the embodiment shown in FIG. 13, the frame structure 6 comprises, for example in the region of the drive pulley station 11 (or the tail pulley station), a section 6a which can be shifted about an adjusting axle 46 together with the pulley T into the replacement position P1 downwards, for example by means of the tensioning cylinders 14 and/or the adjusting drives 23. In the replacement position P1, the pulley T is lying either on the bottom 49 or on a corresponding working surface. The section 6a can be folded away after locking mechanisms 48 have been detached from anchors 47 of the frame structure 6. In the replacement position P1, either one pulley end is exposed, or the pulley T is completely dismounted so that the spare conveyor belt 7E can be mounted. As an alternative, instead of the dismounted pulley T, a reserve pulley TE with a spare conveyor belt 7E reeled on it can be installed before the section 6a is again swivelled upwards about the adjusting axle 46 and locked at the remaining part of the frame structure 6.

In the embodiment in FIG. 14, the tensioning cylinders 14 are also used as adjusting drives for moving the pulley T of the drive pulley station into the replacement position P1. The pulley T is rotatably mounted at both pulley ends at lever arms 50, of which the other ends are fixed in turning and sliding joints 52 in the frame structure 6. A similar principle could be provided in the tail pulley station for the pulley T located there. As the tail pulley does not necessarily have to be adjusted for tensioning the conveyor belt, two lever arms 50 can be mounted there only in swivel joints in the frame structure 6, and the lever arms can be swivelled with the pulley T into the replacement position P1 by means of adjusting drives 23 on both sides, after the pulley has been detached from its guides and rotary beddings and the optionally only single drive motor has also been removed. A guide part 51 removable for a conveyor belt replacement 51 is moreover provided in the frame structure 6.

In the embodiment in FIG. 15, the pulley T is, similar as in FIG. 14, moved to the replacement position by means of the tensioning cylinders 14, adjusting drives 23 being provided at both sides for this, if this is done at the tail pulley station. At the drive pulley station, the tensioning cylinders 14 can be used for this. Instead of only one lever arm 50 on each side, two lever arms 50a, 50b per side are provided here in the form of a toggle link. In FIGS. 14 and 15, the lever arms 50 or 50a, 50b can be placed at the inner surfaces of the frame structure 6 or at their outer surfaces.

In the embodiment of the belt conveyor device F in FIG. 16, a changing magazine 53 is arranged on the inner side in the frame structure 6 at each side of the pulley T (either permanently or only for the conveyor belt replacement), such that it can swivel about an axle 54 in the frame structure 6, to move the pulley detached on both ends via the drive shaft 19 from the (upper) operating position downwards into the replacement position P1, for example by 180° in the direction of the double arrow 56, for example by means of non-depicted adjusting drives 23. The changing magazines 53 are embodied as grippers 55 at their ends by means of which the drive shaft 19 can be detachably engaged, so that the pulley swivelled to the replacement position P1 can be removed and, for example, replaced by a reserve pulley TE with a spare conveyor belt 7E reeled on it. Otherwise, the pulley T moved to the replacement position P1 can be detached from a changing magazine 53 at least one pulley end to be able to mount the spare conveyor belt 7E.

In the embodiment of the belt conveyor device F in FIG. 17 (ascending conveyor), one guide rail 57 each is arranged in the frame structure 6 at both inner surfaces, which extends beyond the operating positions of the pulleys T (in the drive pulley station and the tail pulley station) and is guided to a withdrawal opening of the frame structure 6 via a rail switch 58 with a guide rail section 57'.

In FIG. 18, the respective pulley T (or a reserve pulley TE with the spare conveyor belt 7E) can be shifted with its drive shaft 19 at both ends in the guide rails 57, 57', for example by means of guide shoes 59 or the like.

In FIG. 17, for example a replacement components pack G is placed in front of or in one end of the conveyor line for a conveyor belt replacement. The replacement components pack G contains, for example, two reserve pulleys TE and the spare conveyor belt 7E reeled on it. The replacement components pack G can be contained in a cage or box or a skeleton container, for example to be easily manipulated laterally or in the longitudinal direction by a fork lift. For its conveyor belt replacement, the pulley T is, for example, detached from the frame structure 6 in the tail pulley station (bottom of FIG. 17) and shifted out of the frame structure 6 over the section 57' of the guide rails 57. For this, the rail switch 58 is used. Then, the rail switch 58 is adjusted, and a tension chord is pulled from the pulley T in the drive pulley station (in FIG. 17 for example surrounding) to the reserve pulley TE in the replacement components pack G and fixed thereto. With the motor of the still installed drive pulley, the reserve drive pulley TE is pulled upwards in the guide rails 57 by means of the tension chord. The installed pulley T in the drive pulley station is then detached and either lifted out from one end of the belt conveyor device F by a fork lift, or pulled out along the guide rails 57. Then, the reserve pulley TE is installed in the operating position and fixed. Finally, the reserve pulley TE of the tail pulley station is shifted along the guide rails 57 into the operating position and installed.

FIG. 19 schematically shows a replacement components pack G which can be held ready, for example, in the magazine Z in FIG. 2 at the belt conveyor device F or the construction machine M. This is a reserve pulley TE, for example for the drive pulley station or the tail pulley station, and the spare conveyor belt 7E reeled on it. Here, one has to take care that the spare conveyor belt is not bent, for example by inserting an additional tube. During the conveyor belt replacement, the originally installed pulley T is replaced by the reserve pulley TE.

In FIG. 20, the replacement components pack G is formed by the spare conveyor belt 7E being mounted on a rod-like construction 60 without bends. During the conveyor belt replacement, the spare conveyor belt 7E is mounted on the pulley installed beforehand.

In FIG. 21, the replacement components pack G is only formed of the spare conveyor belt 7E which is folded around rods 61, for example as it is shown, which rods 61 can be easily displaced via rollers 62 in rails in the frame structure 6 of the belt conveyor device F.

In FIG. 22, a replacement components pack G is finally indicated which does not only comprise the partially reeled and folded spare conveyor belt 7E, but also two reserve pulleys TE as well as optionally reserve support rolls 12E. During a conveyor belt replacement, the pulleys T installed beforehand are replaced, as well as optionally also the support rolls 12 installed beforehand.

What is claimed is:

1. A belt conveyor device comprising:
a continuous conveyor belt movable in a conveying plane within a conveying duct on a drive pulley and a tail pulley inside the conveyor belt, and within a frame structure defining the conveying duct and enclosing the conveyor belt at least at both conveyor belt side edges, the frame structure having one of a mechanically or hydraulically actuated drive for adjusting engagement at least one of the pulleys and for moving the pulleys into a replacement position out of the conveyor belt,
the frame structure having (i) at least one alternative space outside the conveying duct that defines the replacement position of the respective drive and tail pulleys and (ii) permanently or temporarily mounted guide means for supporting each of the drive and tail pulleys at least while the pulley is moved by the adjustment drive into the replacement position, and
wherein each pulley is mounted (a) with one pulley end detachably in the frame structure and free to swivel parallel to the conveying plane out of the conveyor belt in the frame structure at the other pulley end to the replacement position about an adjusting axle in the frame structure that is transverse to the pulley axle and perpendicular to the conveying plane, or (b) completely detachable from the frame structure to be laterally shifted out of the frame structure when detached into the replacement position in the direction of a pulley axle and parallel to the conveying plane.

2. The belt conveyor device according to claim 1, wherein the at least one pulley is replaced by a replacement component pack having a spare conveyor belt that is reeled on a reserve drive pulley and/or on a reserve tail pulley located in the frame structure.

3. The conveyor device according to claim 2, wherein the replacement components pack contains reserve support rolls for the conveyor belt.

4. The belt conveyor device according to claim 1, wherein at least some of the adjustment drives of the adjustment means are hydraulic conveyor belt tensioning cylinders of the belt conveyor device.

5. Belt conveyor device according to claim 2, wherein a spare conveyor belt or the replacement components pack is contained in a magazine on the belt conveyor device.

6. The belt conveyor device according to claim 1, further comprising a semi-automatic or fully automatic conveyor belt replacement adjustment device permanently integrated into the belt conveyor device.

7. The conveyor device according to claim 6, wherein the adjustment drives of the adjustment means are hydraulic cylinders supplied from a hydraulic system of the belt conveyor device and/or of the construction machine.

8. The belt conveyor device according to claim 1, wherein guide means for supporting the drive and tail pulleys are inserted into the frame structure for replacement of the conveyor belt.

9. A road finishing machine comprising the belt conveyor device of claim 1.

* * * * *